United States Patent
Halim

(10) Patent No.: US 10,228,979 B1
(45) Date of Patent: *Mar. 12, 2019

(54) DYNAMIC VIRTUAL PARTITIONING FOR DELAYED QUEUES

(71) Applicant: Amazon Technologies, Inc., Seattle, WA (US)

(72) Inventor: AndyGibb Halim, Redmond, WA (US)

(73) Assignee: Amazon Technologies, Inc., Seattle, WA (US)

(*) Notice: Subject to any disclaimer, the term of this patent is extended or adjusted under 35 U.S.C. 154(b) by 149 days.

This patent is subject to a terminal disclaimer.

(21) Appl. No.: 15/209,520

(22) Filed: Jul. 13, 2016

Related U.S. Application Data

(63) Continuation of application No. 14/619,855, filed on Feb. 11, 2015, now Pat. No. 9,424,075.

(60) Provisional application No. 62/110,441, filed on Jan. 30, 2015.

(51) Int. Cl.
    *G06F 9/50*    (2006.01)

(52) U.S. Cl.
    CPC .......... *G06F 9/5077* (2013.01); *G06F 9/5038* (2013.01)

(58) Field of Classification Search
    CPC ....................................................... G06F 9/48
    USPC .................................................... 718/1–108
    See application file for complete search history.

(56) References Cited

U.S. PATENT DOCUMENTS

| | | | | |
|---|---|---|---|---|
| 5,659,786 A | * | 8/1997 | George | G06F 9/4401 710/8 |
| 6,763,519 B1 | * | 7/2004 | McColl | G06F 9/5044 709/202 |
| 6,985,937 B1 | * | 1/2006 | Keshav | G06F 9/5077 370/231 |
| 2003/0204648 A1 | * | 10/2003 | Arndt | G06F 9/544 710/5 |
| 2015/0058866 A1 | * | 2/2015 | Farmer | G06F 1/14 718/107 |

OTHER PUBLICATIONS

Chase, Jeffrey S., et al. "Dynamic virtual clusters in a grid site manager." High Performance Distributed Computing, 2003. Proceedings. 12th IEEE International Symposium on. IEEE, 2003. pp. 1-11.*

(Continued)

*Primary Examiner* — Satish Rampuria
(74) *Attorney, Agent, or Firm* — Davis Wright Tremaine LLP

(57) ABSTRACT

A timer service receives timer creation requests from clients and fires those timers upon their expiration by returning to the requesting clients payloads provided with the timer creation requests. A timer creation request includes a client identifier, a timer expiration time, and a payload. The timer service queues timer creation requests, a creation worker adds timer records to a timer store in response to requests and manages virtual partitions of the timer store, and sweeper workers, one per virtual partition, sweep timers into a second queue. A firing worker reads timer index records from the second queue, determines the timers referenced in those timer index records and executes the payloads of those timers. The timer store can be tiered, with virtual partitions different storage priorities based on the timer expirations of the timers in the virtual partitions.

19 Claims, 8 Drawing Sheets

(56) References Cited

OTHER PUBLICATIONS

Sud, Avneesh, et al. "Real-time path planning in dynamic virtual environments using multiagent navigation graphs." IEEE transactions on visualization and computer graphics 14.3 (2008): pp. 526-538.*
Issacs, Rebecca, and Ian Lesile. "Support for resource-assured and dynamic virtual private networks." IEEE journal on Selected Areas in Communications 19.3 (2001): pp. 460-472.*
Hori et al., "Scalability Issues of Dynamic Space Management for Multiple-Server Networked Virtual Environments," Communications, Computers and Signal Processing, PACRIM Pacific Rim Conference 2011, IEEE 1:200-203, 2001.
Lima et al., "Adaptive Virtual Partitioning for OLAP Query Processing in a Database Cluster," SBBD, 4:95-105, 2004.
Lui et al., "An Efficient Partitioning Algorithm for Distributed Virtual Environment Systems," IEEE Transactions on Parallel and Distributed Systems, 13(3):193-211, 2002.
Mitra et al., "Virtual Partitioning by Dynamic Priorities: Fair and Efficient Resource-Sharing by Several Services," Broadband Communications Networks, Services, Applications, Future Directions, Springer Berlin Heidelberg, 1996, pp. 173-185.

* cited by examiner

DYNAMIC VIRTUAL PARTITIONING FOR DELAYED QUEUES

BACKGROUND

The use of network computing and storage has proliferated in recent years. The resources for network computing and storage are often provided by computing resource providers who leverage large-scale networks of computers, servers and storage drives to enable clients to host and execute a variety of applications and web services. Clients who traditionally used on-site servers and storage equipment often forgo on-site hosting and storage and turn to using the resources of the computing resource providers.

BRIEF DESCRIPTION OF THE DRAWINGS

Various embodiments in accordance with the present disclosure will be described with reference to the drawings, in which.

DETAILED DESCRIPTION

Figure 1:
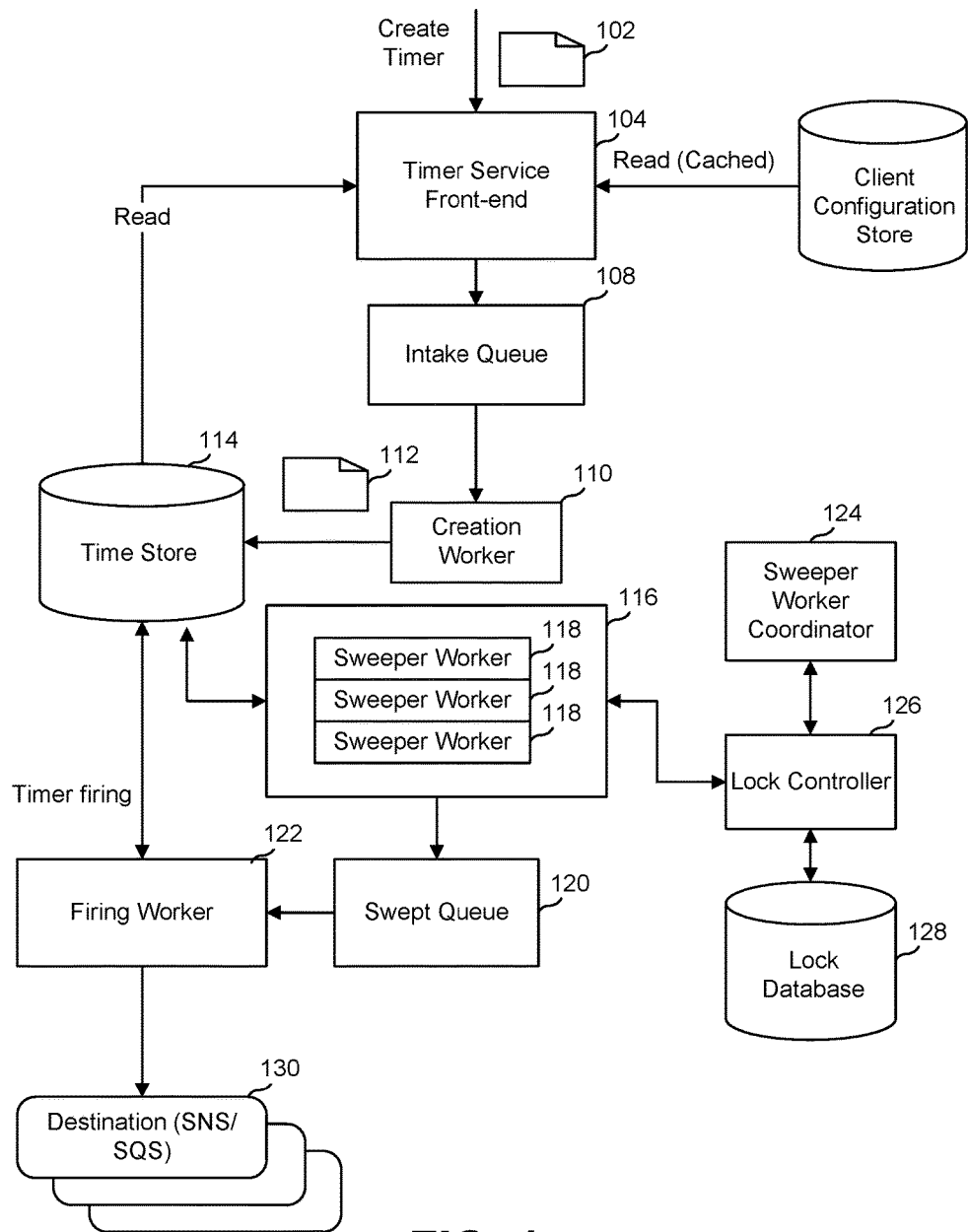
FIG. 1 illustrates an example of a timer service.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems, and processes for managing timers. A timer is a simple computing construct. A software program, client, computer system, etc., might use a timer to cause some action to occur at a defined future time (e.g., the timer's "expiration" time). The timer typically has a defined payload and that payload is sent or executed at the defined future time. The defined future time is typically defined in the timer or timer request. A timer server or system that manages these timers will track the expiration times and at or about the expiration time for a given timer, the timer server or system will "fire" the timer, e.g., by sending or executing that timer's payload. The payload may be as simple as "send this predefined message to the client that set the timer" or more complex and may involve performing some computation and sending some data to a destination other than the program, client, computer system, etc. that set the timer. In cases where a client requests cancellation of a timer, it may be that the timer remains in the timer service, but its payload if flagged so that it does not execute.

As one example, a data maintenance program might set a timer that expires at midnight at the end of the day such that at midnight, the timer "fires" or initiates a backup of some computer system. The timer expiration time might be expressible in a number of ways, relative or absolute, such as "20 minutes after the timer is created", "midnight on the last day of this month", 12:34 pm on May 2, 2015, or the like. Another timer might be set by gift card distribution software that sends an e-mail and updates a user profile with a credit, as might be set by a gift giver desiring that a gift recipient be informed, and receive, an online gift card and have that timer fire at midnight on the date of the gift recipient's birthday. This is useful where the gift giver would like to make arrangements in advance and knows the defined future time that the gift giver would like the event to occur. In that case, the gift giver would, in advance, set a timer for giving the gift and, at the defined future time (midnight on the date of the gift recipient's birthday, in this example), the timer would fire, triggering the action specified by the payload, namely, to send the e-mail and update the user profile.

When the timer service is provided by a computing resource provider, the computing resource provider might provide its clients with an ability to create timers, maintain those timers and then fire a timer action when the timer reaches its conclusion. There are a number of possible congestion points with providing a timer service for a large number of clients.

A timer can be represented by a data structure that contains an identification of the client that set the timer, an identification of the expiration time/date of the timer, and an identification of the action to be taken when the timer is "fired" at expiration. In one such timer service, a client can create a timer by sending a timer creation message to the computing resource provider. The timer creation message might contain a payload and an expiration time. A distributed computing system managed by the computing resource provider would then, at or about the expiration time send the payload back to the client that created the timer. This is referred to herein as "firing" the timer. The distributed computing system might delete the timer after firing or might not delete the timer, however the distributed computing system will maintain some record of the timer from creation to firing.

In the general case, a timer is created with a timer expiration time and an indication of the action that is to occur when the timer is fired (at that timer expiration time). A timer creation request can be in the form of a message, data structure, API call, or the like, where the timer creation request includes the parameters of the timer and/or references to those parameters. Different timer services might have different formats for timer creation requests, but typically a timer creation request would reference the client making the request, a timer expiration time, and the action to be taken at the timer expiration time.

The particular action taken in response to the timer firing can be generalized to emitting a payload that was provided to the timer service with the request for timer creation. In a typical operation, a client submits a request to create a timer, including with that request a client identifier (if one is not already known to the timer service from other contexts), a specification of a timer expiration time, and a payload to be returned to the requesting client when the timer fires. Some timers might be repeating timers (e.g., timers that expire at the end of each hour), but such repeating timers might just be treated as multiple timers that each fire only once without interfering with the understanding of the teachings herein.

The payload might be empty, in which case the response to the timer firing might simply be a message sent to the client to signal that the timer has fired. In other cases, the payload is data that the requesting client is storing with the timer and is passing that data forward to that requesting client in the future. In some cases, it might be that the requesting client and the recipient of the payload are distinct, but that should be understood as a straightforward variation of what is described herein.

In the general case, a payload might be represented by a data structure provided to the timer service when a client sets a timer with the timer service. It may be that the structure of the payload is totally opaque to the timer service and all the timer service knows is that it was provided with payload data and the timer service is expected, at the firing time of the timer, to send the payload data to some destination, which might be the client or some other destination, such as a network location, queue, etc. specified in the timer request. In other cases, there might be some processing that the timer service does with the payload data, in which case, perhaps not all of the payload is opaque to the timer service. In examples herein, executing a payload is what happens upon a timer firing and executing that payload could involve sending one or more messages to one or more destinations, performing operations at the timer service or controlled by the timer service, or some other action defined by the payload.

Clients may expect to have the payloads of timers they set executed in a timely manner. If a client specifies that a timer is to fire (and as a result, its payload to be executed) at Time T, the timer service should fire the timer at Time T, not before and not after. Some time period of nonzero duration might be considered an acceptable equivalent to Time T, such as T+/−1 millisecond. What constitutes "timely manner" might be defined by the timer creation request, a service level agreement, or some other method.

A reliable timer service will accept timer creation requests, not lose the timers, and execute the payloads in a timely manner upon firing. With a large number of clients, not all of which are predictable in behavior, the reliable timer service should be able to scale up and down. As an example, a service level agreement might specify that payloads that comprise sending a message will be executed within +/−1 second of the requested expiration time for the timer. A client might specify a jitter period of 20 seconds, in which case a timer would be timely if it is fired and a payload executed between the requested expiration time and 20 seconds after the requested expiration time. Timely manner includes firing timers not too late, but also includes not firing them too soon.

The timer service might be implemented by networked computers, storage systems, and communications paths. Potential congestion points might involve incoming timer creation requests, firing timers, and storing long-lived timers. Some actions by clients might involve one, two, or all of these congestion points. For example, some clients have a very high, bursty timer creation rate but well distributed firing times. Scaling for those clients might only require scaling up the intake capacity. Some clients might have a steady timer creation rate but be creating timers with firing times highly concentrated around a specific time period, in which case the timer service might not need to add resources to intake capacity, but just to firing capacity. Some clients might create many timers that are short-lived timers, so the timers come and go quickly, while other clients might create long-lived timers, in which case demand for timer storage would increase even for steady timer creation rates and steady timer firing rates.

A timer service might be provided by a cloud computing resource provider. In a typical cloud computing environment, clients request resources from a cloud computing service. Those services might include an allocation of computing power, storage, communication, or other functions. The client requests might be in the form of API calls to a server, where the server might reply with an acknowledgement and trigger allocation of the resources. Since the resources are often available for use by many clients, inefficient use of resources may result in lost revenue or usability. As a result, efficient use of shared resources is often a goal of providers of such computing environments. In the case of the timer service, the timer service can be more efficient if it can independently scale along the different dimensions rather than just scaling up capacity in all directions when more capacity is needed in timer creation, timer firing, or timer storage.

A timer service can be used as part of a delayed queuing service. Using the timer service, a client can implement a queue that the client can place a payload onto with the assurance that it will emit from the queue at a specified future time. In many of the examples here, the payload is described as being emitted to the client that requested creation of the timer, but the payload can flow from one system or instance to another system or instance, after the specified delay using a number of mechanisms, implemented at the client or the timer service. For example, the client might be set up to route any received timer payloads to their ultimate destination or the timer service could be set up to include a destination in the timer creation request that is distinct from the client identifier of the request. In other variations, the timer service might maintain a mapping of destinations by client. Whether the timer service is used as a timer service directly or as a distributed queueing system that manages delayed queues, there are a few challenges. One is how to scale for timer or queue item creation. Another is how to scale for timer firing or queue item processing/delivery. Another is how to efficiently store and process the requests between creation and completion/firing. Some aspects of timer systems that meet these challenges are presented in the figures.

FIG. 1 illustrates an example of a timer service. In that figure, various components are shown as blocks with interconnecting pathways. The components might be implemented on dedicated hardware, logically allocated among other tasks being performed by hardware, or be implemented entirely on software running on some hardware platform. For example, some or all of the components illustrated in FIG. 1 might be implemented on a web service that provides resizable compute capacity in the cloud such as Amazon's EC2 web service. Therefore, it should be understood that the blocks might be physical blocks or programs running in a processor space and the pathways might be logical computing communications or messaging pathways implemented in software.

As shown, the timer service has an input to receive requests to create timers such as request 102. These requests might be in the form of data, messages, API calls or other methods of communicating requests. A timer service front-end 104 might be the endpoint recipient for these requests. Request 102 can include an indication of the client making the request, the timer expiration time (in relative or absolute terms), and a payload, as explained below.

Upon receipt of request 102, timer service front-end 104 consults a client configuration store 106 to obtain details for operations involving some clients. Client configuration store 106 might contain data indicating, for some clients, their stated throughput requirements. For example, a client might have previously sent a message to the timer service or some other cloud computing component to indicate that the client would only be making ten transactions per second with the timer service. The client might be billed or allocated resources accordingly and the timer service front-end 104 can choose to throttle, reject or accept timer creation requests based on the number of timers actually being requested. In some implementations, no throttling occurs and in others, throttling only occurs when timer service front-end 104 begins to get overloaded with requests.

Timer service front-end 104 might also check whether a requested timer already exists, so that in a reply to the requesting client, the timer service front-end 104 can indicate that the timer already exists. Timer service front-end 104 might also manage metrics such as the creation rate of each client, to facilitate adding alarms or otherwise dealing with creation rate relative to requested transactions per second ("TPS"). Timer service front-end 104 might also be able to handle intake of timer creation requests when other parts of the timer service are down or performing poorly.

Timer service front-end 104 is coupled to an intake queue 108 where timer creation requests are placed and used first-in, first-out, or according to another queuing scheme. A creation worker 110 takes a timer creation request off intake queue 108 and generates a timer record 112 for the removed timer creation request and updates a timer index record (or creates a new one). The timer record might simply be a copy of the timer creation request if it is already in suitable form. Variations are described in further detail below. Creation worker 110 stores timer record 112 into timer store 114 and might repeat this process many times until intake queue 108 is empty.

Timer store 114 might be in the form of a distributed key-value pair database with support for strong consistency and using a primary/entity key and discriminator framework. The timer records stored in timer store 114 can be allocated to virtual partitions. These can be in addition to hard partitions of a database that is used for timer store 114. A plurality 116 of sweeper workers 118 monitors timer store 114 to identify timer index records that are expiring timer index records. An expiring timer index record is a timer index record that contains references to timers that are about to expire. Timers that are about to expire are timers represented by timer records with expiration times (specified expiration times or scheduled expiration times; the difference is explained below) slightly before a current time. How slightly before a current time an expiration time needs to be do cause a timer record to be identified by the sweeper workers can depend on configuration settings set by the timer service. Evaluation might be done by evaluating a current time and comparing it to the expiration time of the timers, as indicated in the timer records.

Sweeper workers 118 might be in the form of sweeper worker processes executed by some computer hardware. As used herein, "process" as in "sweeper worker process", "creation worker process", etc., might refer to a software unit that is invoked by an operating system or the like so that the software unit executes and performs the functionality sought. For example, a sweeper worker process might be embodied in software instructions that run in a loop while executing to sweep timer index records from a virtual partition and perform other functions. Such software processes can be invoked, started, stopped, and deleted.

When a sweeper worker identifies such a timer index record that references timers that are reaching their expiration times, that sweeper worker adds that timer index record to a swept queue 120. As explained in more detail below, the number of sweeper workers 118 might be set so that there is one sweeper worker process for each virtual partition of timer store 114. New virtual partitions might be created by creation worker processes as they detect that existing virtual partitions are nearing capacity. Other methods of creating virtual partitions are described herein, such as based on scaling schedules anticipating future needs for virtual partitions. Each virtual partition might be a unit of logical division in a storage node that supports the timer store and supports prefix key queries, in a strongly-consistent data store.

As sweeper workers sweep the timer index records and after having enqueued them to the swept queue, the sweeper workers will mark those timer index records as having been swept/processed. The sweeper workers will also set a time-to-live ("TTL") value for those records, so that a later garbage collection process will automatically purged those timer index records at some point. A primary sweeper worker might miss a timer index due to some local congestion or a sweeper worker failure. The primary sweeper worker can be programmed to continue moving forward through the timer index records even if some might have been missed. In that case, a stale sweeper worker might run a little behind the time of a primary sweeper worker to sweep up timer index records that are skipped or missed by primary sweeper workers. This helps ensure that each timer gets fired at least once.

A firing worker 122 takes timer index records off of swept queue 120, and for each timer index record, sends the payloads of that timer index record's timer records to the destination 130 identified in those timer records, executes the payloads, or some variation. Firing worker 122 might send a payload to a notification service or queuing service that is tasked with reliably getting that payload back to the client or to the destination that the client specified when creating the timer record. For example, destination 130 for the payloads might be an Amazon Simple Notification Service ("SNS") queue or an Amazon Simple Queue Service ("SQS") instance. Other destinations are possible and they need not be identical to the client that initiated the timer. Firing worker 122 might execute multiple payloads as a group, such as when there are several payloads that are directed to one destination.

A sweeper worker preferably deals with a timer index record at some time before the expiration times of the timers referenced in that timer index record, so that the firing worker is able to execute the payload of a timer at its expiration time. The criteria that the sweeper worker uses to evaluate when a timer is reaching its expiration time may depend on how the sweeper worker is configured. For example, if a primary sweeper worker reviews its assigned timer index records once per minute, failure and reinstantation of the primary sweeper takes two minutes at most, and the stale sweeper worker executes with a time that is five minutes behind the primary sweeper worker, then the sweeper workers might move timer index records to the swept queue at least six minutes before the expiration times of timers in those timer index records. That way, timer index records will reach the swept queue before the expiration time of the timers referenced in those timer index records even if the primary sweeper worker fails. The timer service might have a configuration file that specifies what constitutes nearing expiration and/or that criteria that a sweeper worker is to use in evaluating timer index records for nearing expiration.

Some of the components shown in FIG. 1 might use existing structures. For example, intake queue 108 and swept queue 120 might be implemented using Amazon Simple Queue Service ("SQS") instances. A lock controller 126 and a sweeper worker coordinator 124 might be used to provide distributed locking services and to manage the sweeper workers, respectively. Lock controller 126 might maintain the locks in a locks database 128 that is a strongly-consistent database.

Figure 2:
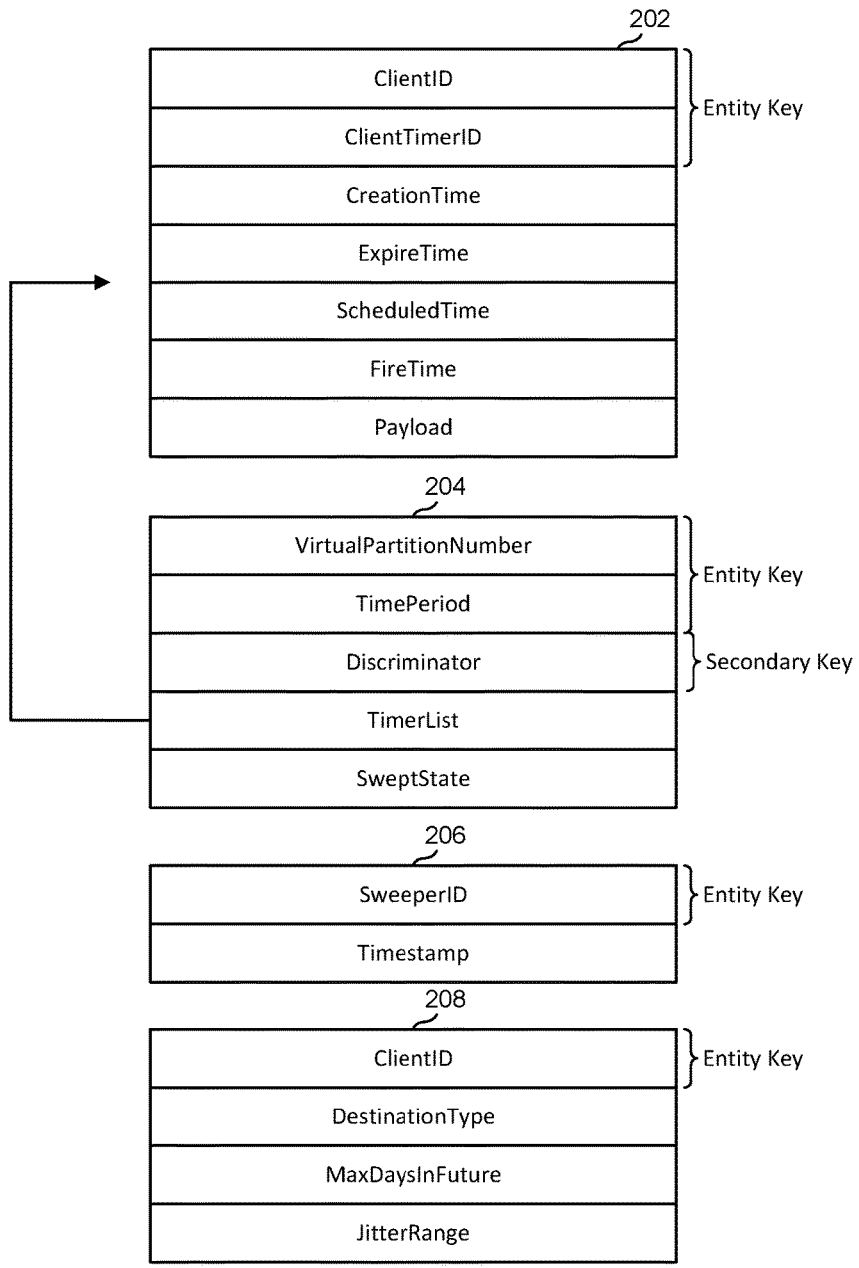
FIG. 2 illustrates record structures as might be used for tables in a timer store.

FIG. 2 illustrates record structures as might be used for tables in timer store 114. As illustrated there, in one example, there are four tables: a timers table, a timers index table, a sweeper checkpoints table, and a client configuration table. A record in the timers table might have the fields shown by example data structure 202, a record in the timers index table might have the fields shown by example data structure 204, the sweeper checkpoints table might have the fields shown by example data structure 206, and the client configuration table might have the fields shown by example data structure 208.

Data structure 202 has fields for a ClientID, a ClientTimerID, a CreationTime, an ExpireTime, a ScheduledTime, a FiredTime, and a Payload. This might be used as the data structure for a timer record. The ClientTimerID might be a unique identifier provided by the client, so that the client can match up returned payloads with timer creation requests made. In some variations, the CreationTime might not be included as a field. The entity key for the timers table might be ClientID+ClientTimerID. In some variations, there are separate data structures for long-lived timers and short-lived timers. The dividing length for the two might be set by a configuration file. For example, a configuration file might specify that long-lived is greater than one hour and short-lived is less than one hour. The ExpireTime might be a specified time specified by the client. The ScheduledTime might be a time calculated from the ExpireTime and a jitter delay, representing a variance on the expiration time that is acceptable to the client. The jitter period might be specified by the client as an acceptable variation of the expiration time. For example, a client might specify an ExpireTime of 2015/12/25/12:00 AM PST and specify a jitter of 5 minutes. In that case, the ScheduledTime might be anywhere between 12:00 AM and 12:05 AM and still satisfy the clients' requested delivery time. The FiredTime is set after the timer is actually fired and is the actual time of firing. A quality monitoring process and/or an alarm process can monitor the differences between ScheduledTime and FiredTime to take appropriate actions.

Data structure 204 has fields for a VirtualPartitionNumber, a TimePeriod, a Discriminator, a TimerList, and a SweptState. This might be used as the data structure for a timer index record. The TimePeriod might be a pointer to a time period that has a predefined granularity, such as a pointer to a specific second with the granularity being one second, so that a record might relate to a group of timers that all expire within that one second period. The TimePeriod might also be made up of a start time and a stop time of a period. The TimerList is a list of identifiers of the timers that are indexed in that timers index table record. The TimerList might be a list of timer references by entity key (e.g., ClientID+ClientTimerID). The SweptState can be a binary value from the set {0, 1} where "0" indicates that the timer index record (and by extension, the set of timers referenced in TimerList) has not yet been swept into the swept queue and "1" indicates that it has.

The records in the timers index table have a Discriminator field. The discriminator might be a decreasing index that allows for prefix searches to quickly identify the next available index number. The value of the discriminator might start at some predefined high-watermark value. Then, if a timer index record is already full and a new one needs to be added with the same entity key, its discriminator value would be decremented by one. Since the list of records that share the same entity key are sorted in increasing lexicographical order, retrieving the first one would instantly indicate how many records there are under that same entity key.

The entity key for the timers index table might be VirtualPartitionNumber and TimePeriod. In some implementations, VirtualPartitionNumber and TimePeriod are not separate fields, but a concatenation is used to make up a single value for the entity key. To alleviate the case of there being a hot spot during creation and firing, virtual partitions can be used to spread the requests across available partitions. Each index record might be modeled as a discriminator, essentially returning each index entity key as a list (of index records). Note that by aggregating timer references for those timers that are due to fire at the same time into the same index record, this simplifies handling large index records and allows for fewer discriminator records per entity.

Data structure 206 has fields for a SweeperID and a timestamp. The SweeperID might be a VirtualPartitionNumber where there is one sweeper worker instance per virtual partition. The timestamp might be in UTC. The entity key for the sweeper checkpoints table can be the SweeperID. Sweeper checkpoints are useful for managing stale sweeper workers that pick up timer index records that other sweeper workers might have missed or skipped to avoid falling behind.

Data structure 208 has fields for ClientID, DestinationType, MaxDaysInFuture, and JitterRange. The entity key for this data structure is the ClientID and this data structure can be used for storing client-specific values. The ClientID might be a 32-character string that identifies a client to the timer service. The DestinationType field might be a byte that identifies the destination type of client and/or timer requests that come from that client. The MaxDaysInFuture field represents a client-specific setting that governs how far in the future a particular client is allowed to create timers for, which might be used to account for resource constraints and to reduce possible abuse. The JitterRange is the amount of allowed variation between the client's stated expiration time and its scheduled time, as explained elsewhere herein.

Using the data structures of FIG. 2 and the components of FIG. 1, a timer service can field timers in a flexible manner. By using multiple sweeper workers, the work needed to fire off the expiring timers can be distributed. The timer service can automatically manage the up/down-scaling of processing capacity of queue items by dynamically controlling virtual partitions.

The virtual partitions might be distributed over many hosts and those hosts might have varying storage structures. Those storage structures might also have varying priorities, speeds, capacities, and storage costs. Some virtual partitions might be higher priority (hot-store) and some lower priority (cold-store). Lower priority virtual partitions might be used to hold timer index records for timers with expiration times in the far future and higher priority virtual partitions might be used to hold timer index records for timers with expiration times in the near future. It may be that the timer service maintains a priority expiration value that divides far future expiration times from near future expiration times and the creation worker uses that priority expiration value in part to determine which virtual partition to use.

FIGS. 3-7 are swim diagrams illustrating various flows between components such as those shown in FIG. 1. A timer service might be initialized to have some pre-defined number of virtual partitions to start with. In some of the figures, only one sweeper worker is indicated, but it should be understood that there may be many similarly operating sweeper workers.

Figure 3:
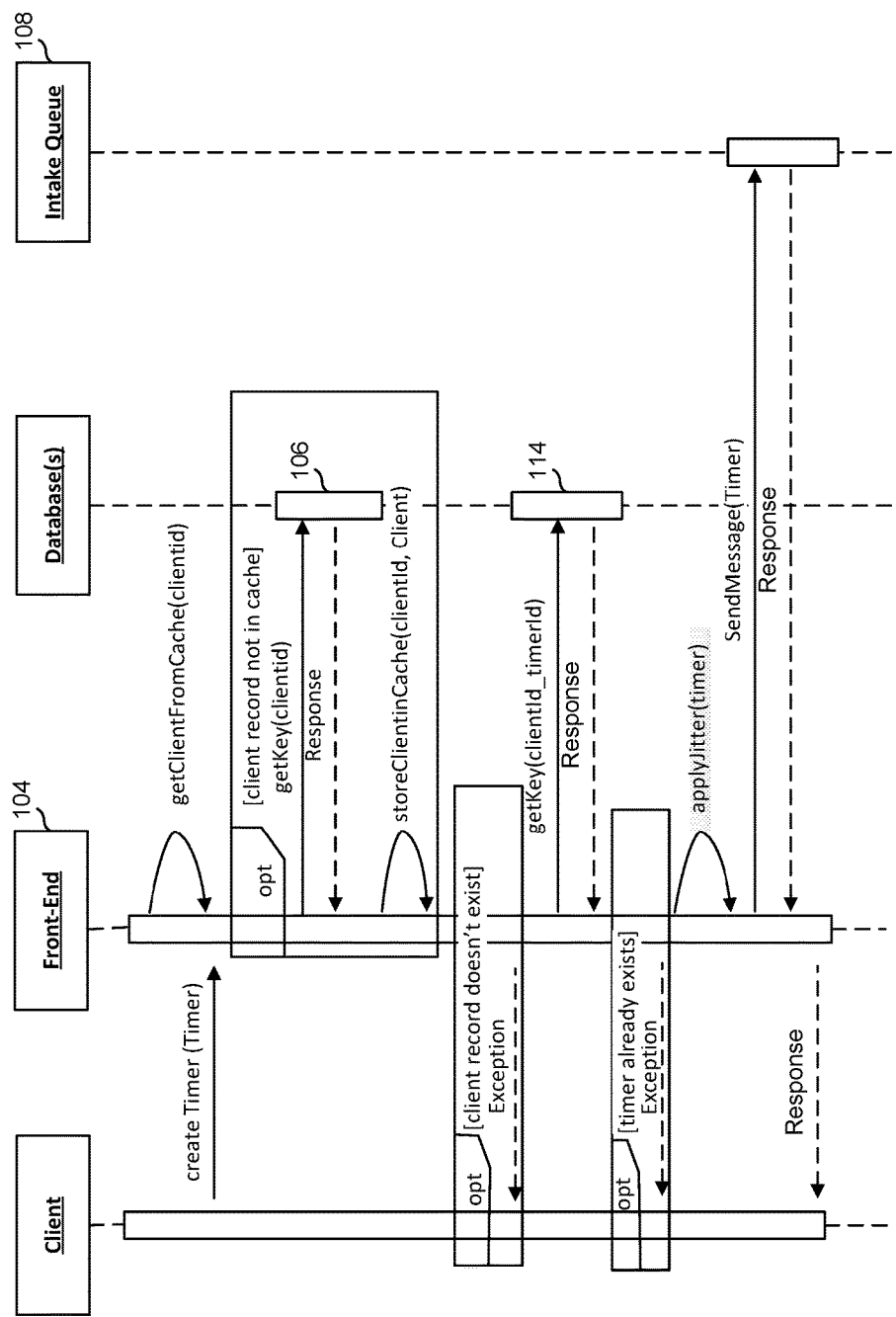
FIG. 3 is a swim diagram of various interactions for intake of a timer creation request.

FIG. 3 is a swim diagram of various interactions for intake of a timer creation request. The components interacting are a client, the front-end, databases, and the intake queue. The client can be any program, system, instantiation, or the like that is attempting to create a timer to be managed by the timer service. The front-end is at the input of the timer service and might be in the form of a web-enabled API interface or other construction that allows it to receive requests from clients. The databases might comprise one database management system that handles multiple tables or stores, such as client configuration store 106 and timer store 114 shown in FIG. 1.

The timer creation process begins with a client making a "create timer" call to the front-end with a Timer data structure as an argument of the call. The Timer data structure might be like data structure 202 shown in FIG. 2. When the front-end receives the call, it can extract a client identifier ClientID from the Timer data structure. The front-end would then get client details using ClientID. Those details can come from cached records at the front-end or, optionally if the records are not cached, using a getKey(ClientID) call to a database such as a client configuration store and the front-end could cache those details. If the details indicate that the client is not authorized to create timers, or if the client record does not exist, the front-end can return an exception to the client.

To avoid duplicates, the front-end can issue a getKey (ClientID_TimerID) call to a store such as timer store 114 and look at the response to determine if a timer with that TimerID already exists for that ClientID. If so, the front-end can return an exception to the client. However, if that is not the case, the front-end can apply a jitter to the timer and send the Timer data structure as a message to the intake queue. If the intake queue response with an acknowledgement, the front-end can assume that the process is complete and inform the client that the timer was created. The jitter is useful for firing a large number of timers over a wider period while still complying with client requirements in cases where the exact time of firing is not critical to the client.

If the timer store or the client configuration store are down or returning any exceptions, the front-end might still enqueue the timer creation request to the intake queue and send an acknowledgement to the client. Some error messages or alarms might be emitted. If the intake queue is down or returning any exceptions, the front-end will fail the request back to the client.

Figure 4:
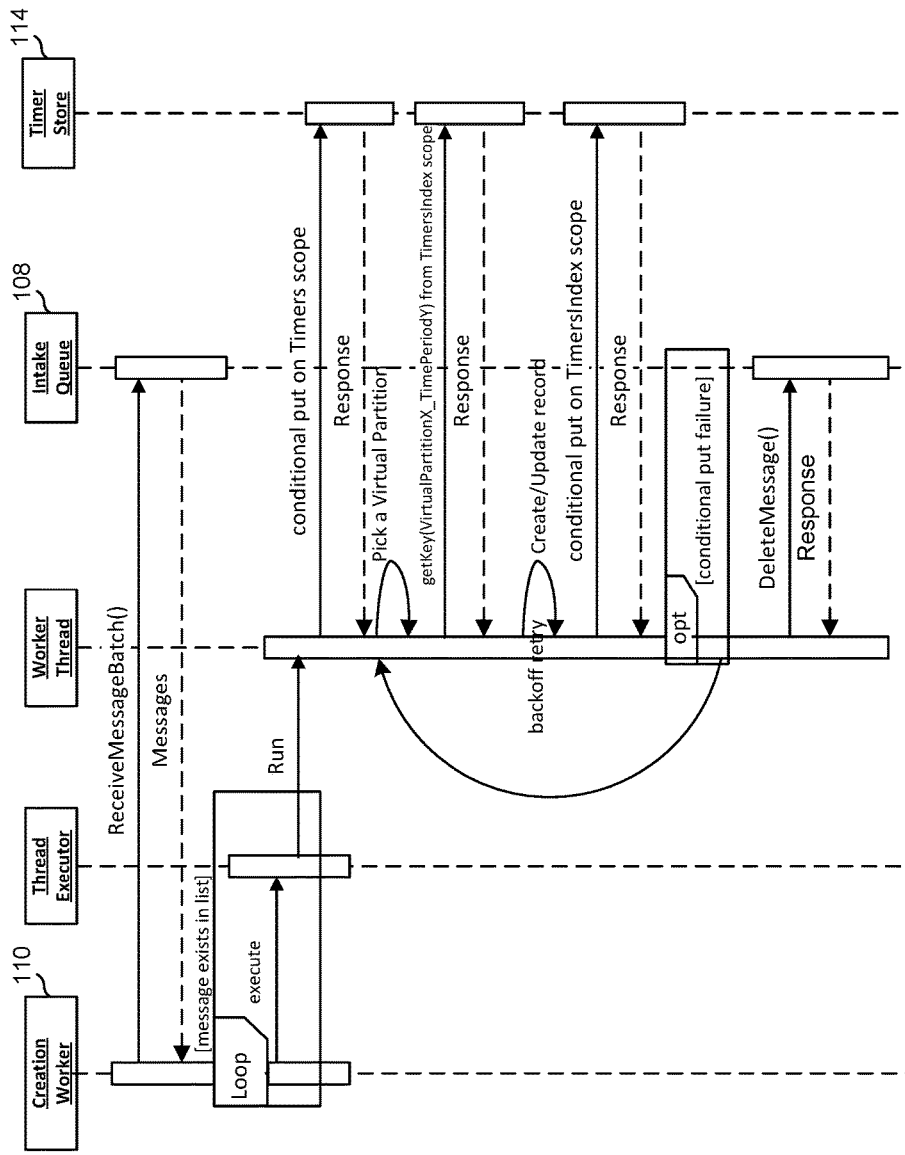
FIG. 4 is a swim diagram of various interactions for creating timer records from incoming timer requests.

FIG. 4 is a swim diagram of various interactions for creating timer records from incoming timer requests. The components interacting are a creation worker, a task executor, a worker thread, the intake queue, and the timer store. The timer record creation process begins with the creation worker requesting a batch of timer creation requests from the intake queue. This can be done using batch API calls and LongPolling (to increase retrieval efficiency and reduce cost). Since the front-end puts the requests onto the intake queue and the creation worker takes requests from the intake queue and can do so without needing to be in sync, congestion at the front-end will not spill over to the creation worker and congestion at the creation worker will not backlog the front-end (unless the intake queue overflows, but that can be avoided). The intake queue responds with a batch of messages, but those messages remain in the intake queue at this point.

The creation worker then delegates to a number of worker threads via a ThreadExecutor and each worker thread creates its assigned timer record in Timers scope as well as creating and updating a timer index record for the timers in the TimersIndex scope. The timer index record might be created and managed by (1) determining the virtual partition under which the timer index record should belong and (2) reading the target timer index record based on the virtual partition and expiration time of the timer. If the target timer index record does not exist, one can be created with the Timers-Index scope, or if it already exists, the worker thread will append a reference to the existing record.

In some cases, placing the timer record into the timer store can be done using a conditional put, and if that fails, repeat from step 1 above after a backoff retry, as illustrated in FIG. 4. If the timer record is successfully placed into the timer store, then the worker thread can tell the intake queue to delete that timer creation request.

If the intake queue is down or returning any exceptions to the creation worker's batch requests, calls, timer creation requests would not be lost, but this condition might trigger a log entry and an alarm. If the intake queue is down or returning any exceptions to requests to delete messages, those timer creation requests will be made visible again at some point and might cause increased number of duplicate index record references if this is sustained in a short period of time, but otherwise might not need any special handling.

If the timer store is down, the error might be logged and the worker thread will not proceed further. The message will be made visible again by the intake queue after a visibility timeout period. If the timer store is returning non-retryable exceptions, the error might be logged and the worker thread will not proceed further. This type of exception (other than the conditional put failure), should hopefully be rare, but if/when it occurs an immediate alarm might be triggered. Where the timer store is returning retryable exceptions, the worker thread can just backoff retry up to a certain number of time, after which the treatment is the same as above.

If the timer store returns conditional put exceptions for timers, no action need be taken. This might happen if the timer index record creation/update fails or if there are extreme number of duplicate requests in a short period of time. The backoff retry may deal with those cases.

If the ThreadExecutor's backing queue is full, the main thread will be blocked. If this persists long enough, messages will be made visible again by the intake queue after a visibility timeout period and could cause increased number of duplicate index record references. This can be accounted for when choosing the visibility timeout period.

The sweeper workers and sweeper worker coordinator can be managed using a worker-coordinator structure. In that structure, the sweeper worker coordinator controls assignments for sweeper workers and sweeper workers can be added as needed. This can be done using a lock manager, membership store, and assignment store. The sweeper worker coordinator handles group membership of the sweeper worker hosts. This can be based on monitoring the sessions established by those hosts using a watcher system. The sweeper worker coordinator handles assigning virtual partitions to sweeper worker hosts based on a "least number of virtual partitions" process and in case of ties, a simple random choice can be used for the tie-breaker. The assignment of virtual partitions are done by writing a value corresponding to the virtual partition number to the appropriate sweeper worker entry, which in turn corresponds to and is being monitored by a sweeper worker host. Redundancy for the coordinator can be handled by having multiple hosts vying for the same lock. The sweeper worker coordinator should have the same information as the creation worker in terms of how many virtual partitions there are. This can be configured statically via a shared configuration file or it can be dynamic.

Even if the lock manager is down or membership cannot be detected, if there is no churn in the existing active sweeper worker hosts, then everything should continue to work fine. If there is some churn, then there may be unassigned virtual partitions from the sweeper worker hosts that went down during the outage. Eventually when the lock manager comes back up, the stale sweeper workers of those virtual partitions will pick up any missed timers and get them to the swept queue in time for a firing worker to get to those timers. Unassigned virtual partitions can be alarmed. If returning locks to multiple coordinators, if all virtual partitions have been assigned and there is no churn in existing active sweeper worker hosts, then in theory there should be no impact. During any sweeper worker hosts transition, there might be multiple assignments for the same virtual partitions (as different coordinators may come up with a different conclusion in terms of who gets what, whichever writes the last wins). As long as there is a sweeper worker per virtual partition, this should not cause problems.

Each sweeper worker could use a watch function to watch for an entry corresponding to that sweeper's host in the assignment store. Once the sweeper worker coordinator writes to that entry, that serves as the official assignment of that host for a given virtual partition. The sweeper workers will then read the timer index records based on the virtual partition assigned to them and the current time, and enqueue any unprocessed timer index record chunks to the swept queue. The timer index records in the swept queue will ultimately be processed by the firing workers. The sweeper worker also updates records as having been processed. A stale sweeper worker will follow behind the current time, from the last checkpoint time, enqueue any unprocessed index records it finds, and progress its checkpoint time.

Figure 5:
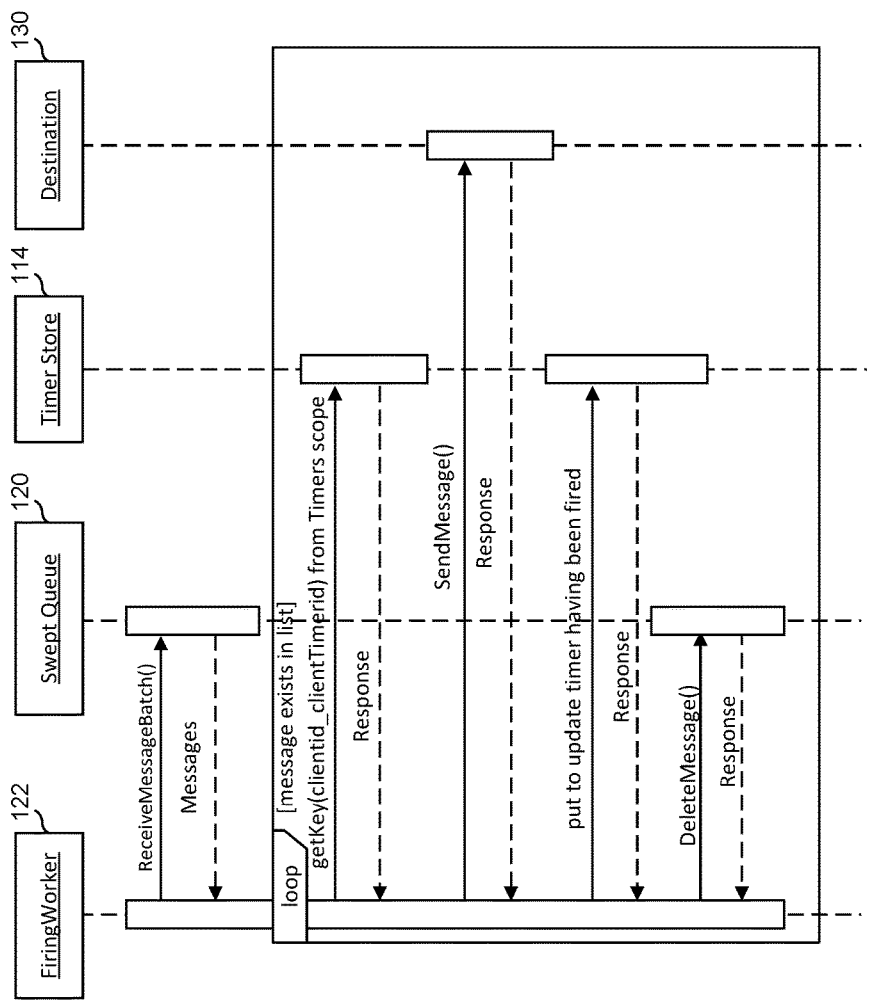
FIG. 5 is a swim diagram of various interactions for a firing process.

FIG. 5 is a swim diagram of various interactions for a firing process. The components interacting are a firing worker, the swept queue, the timer store, and a destination queue. The destination queue might be an Amazon simple query service ("SQS") instantiation. A firing worker receives batches of timer index records enqueued by the sweeper workers and fires the payloads of the timers referenced in those timer records to the destination queues of those timers. The destinations for the payloads might be distinct from the clients that created timers and provided those payloads. Once messages are sent to the destination queue, the firing worker can request that the timer index record be deleted from the swept queue. This can be done by having the timer records marked as having been fired and their TTL set for automatic purging.

Figure 6:
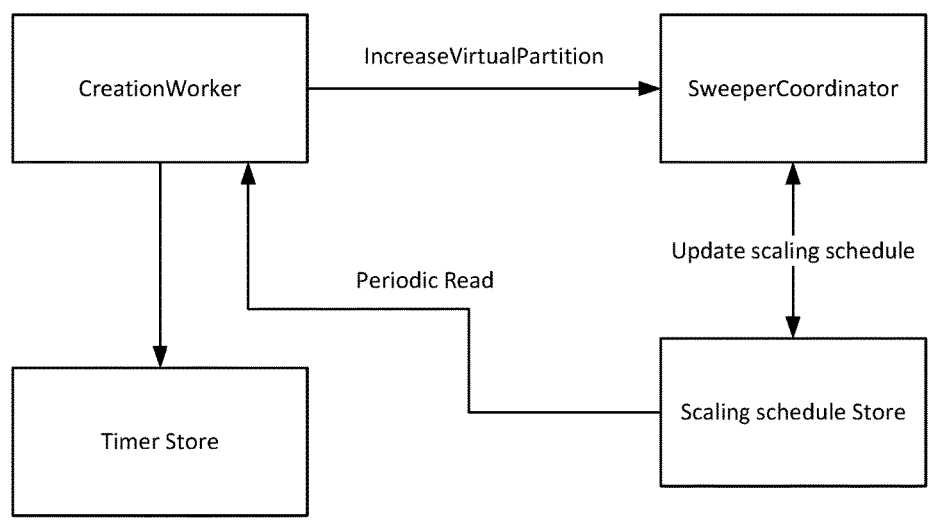
FIG. 6 illustrates an aspect of dynamic virtual partitioning.

FIG. 6 illustrates an aspect of dynamic virtual partitioning. The configurations described above may cover most cases provided that enough virtual partitions are allocated to spread the load of timers firing. This can be done either up front as the base number of virtual partitions, or it can be done just before on-boarding a new client with high throughput requirements. Virtual partitions can also be added as needed by the creation worker process.

Where there is a "hotspot" in one or more of the virtual partitions for a particular time period, there might be an extreme number of discriminator records under the same virtual partition index record entity key in the timer store, which could slow down the sweeper workers, thus lowering the firing throughput and, in the worst case, cause the timer service to miss its firing service level agreement ("SLA").

This can be dealt with by automatically scaling the sweeping and firing throughput using dynamic virtual partitioning. When processing a timer creation request, the creation worker process knows upon reading the first record for a timer index key approximately how many discriminator records (and by proxy, the number of timers) currently exist for that timer index key (by way of the tail attribute, which is monotonically increasing). If the creation worker detects that a maximum number of records is being approached beyond which maintaining the average throughput would be difficult, it can decide to increase the number of virtual partitions, which should then trigger instantiation of additional sweeper workers for the new virtual partitions. Instantiation might be performed by requesting that an operating system allocate resources for the additional sweeper workers, load program code for those additional sweeper workers into program memory of a processor, and then start the program code executing.

In some variations, the creation worker or the sweeper worker coordinator is designated the authority on the number of virtual partitions that are present. For example, the creation worker could send a message to the sweeper worker coordinator, which will then update a virtual partitioning configuration file read by both, in addition to potentially kicking off other things such as launching additional ACC hosts.

The increased number of virtual partitions may not necessarily and consistently be needed at all times (for example, midnight period may be more popular than others), and it would be a waste of resources to always scale up to the maximum level. To account for this, a scaling schedule might be used that would provide information about how many virtual partitions are needed at any given time. A data model for the scaling schedule might include an entity key, one record that is the default record that indicates base number of virtual partitions, and one or more keys for various period identifiers (where the period can be weeks, months as necessary), to serves as kind of an override record to the default. A granularity might be provided for the scaling schedule.

Each virtual partition might be configurable in various ways, such as a configuration to limit the number of things that can be assigned to that virtual partition at any given time. These configurations can be made vary based on the needs and/or the physical host specification that backs the virtual partitions, and might include the maximum number of records, where a record is an aggregation of queue items, and the maximum number of items per record.

When the creation worker creates a timer record and creates or updates a timer index record, the creation worker determines which virtual partition to assign the timer record to. This assignment could be random, round-robin, based on the timer expiration time, or some combination of these or other factors. In some instances, it might be desirable to aggregate timers with similar expiration times into one virtual partition, while in other instances it might be desirable to distribute such timers over different virtual partitions.

When the creation worker determines that an additional virtual partition might be needed, it can trigger the creation of that virtual partition. One way to do that is by assignment of keys to records. This might be on a keying scheme in which a key comprises a virtual partition ID, a time for when the queue item is to be processed and an integer representing the max number of records. Each of the parts is in turn separated by some delimiter. So for example, the first record that is assigned to virtual partition A and scheduled to be processed at time T1 and where the max number of records is 100 and with delimiter being _ (underscore) would have key A_T1_100. The records per virtual partition are then ordered in increasing lexicographical order. So for example, a record with key A_T1_099 would appear before a record with key A_T1_100. The creation worker can query the virtual partition based on the prefix A_T1 (using the above example) for the first record that matches that prefix. The result of this operation instantaneously informs the creation worker the state of the virtual partition in terms the number of records (and by implications, an approximate number of items) for that virtual partition without having to look through the entire timer store. This is due to the key scheme and ordering mechanism.

When storing a timer record, if there is no record returned, the creation worker can store the item using the key from the query. If a record is returned, check if the number of items per record exceeds a setting. If not, the item can be stored using the key. If yes, it will check whether the third part of the key is greater than zero and if so, it will then construct a new key with the third part of the key being the prior key decremented by 1. So for example, if the prior key was A_T1_099, a new key of A_T1_098 would be created.

If that does not work, then this particular virtual partition is considered exhausted. There are a couple of options at this point, which is to start the process all over again by randomly picking a different virtual partition, or dynamically create new ones. In practice, either of these steps likely should be taken before a virtual partition is fully exhausted and so some buffer that is determined to be safe can be established as an early warning mechanism.

For dynamic virtual partitioning, a scaling schedule is created, which contains a default number of virtual partitions that are used at a steady state and a list of overrides corresponding to the specific times where the number of virtual partitions need to be increased. The override for the scaling schedule can be specified when the system thinks a virtual partition may be at risk of being exhausted soon. The system would then periodically scan the scaling schedule and for any overrides that are coming up soon (per some criteria that it uses to determine that), it would then automatically scale-up various parts of the system to be able to process the items due per the override period.

This might be done by launching new hosts for the additional virtual partitions and assigning them to specific partitions. The timer service would know when upcoming hot-spot periods will arrive and when things will be back to the steady state. After the hot-spot periods, the timer service can deprovision the additional capacity that it launched in order to prevent idle resources and wasted cost. The virtual partitions might be distributed over a plurality of physical hosts.

Figure 7:
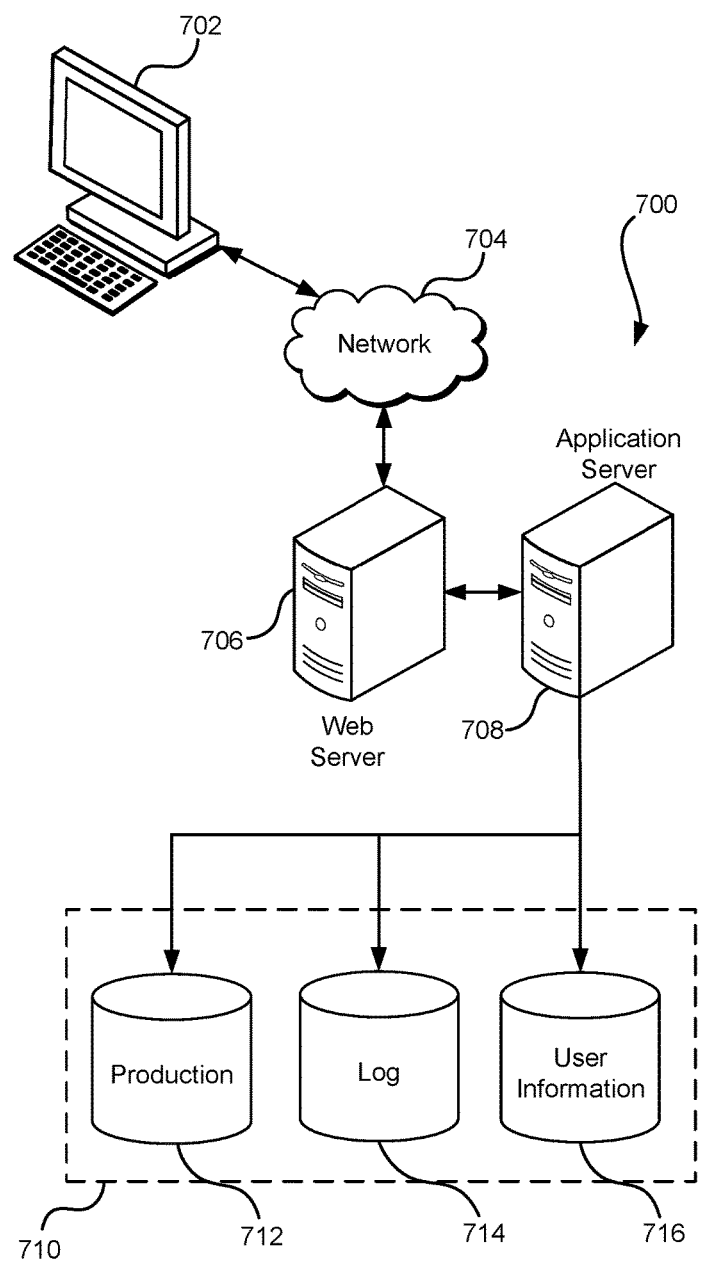
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 702 and the application server 708, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

Figure 8:
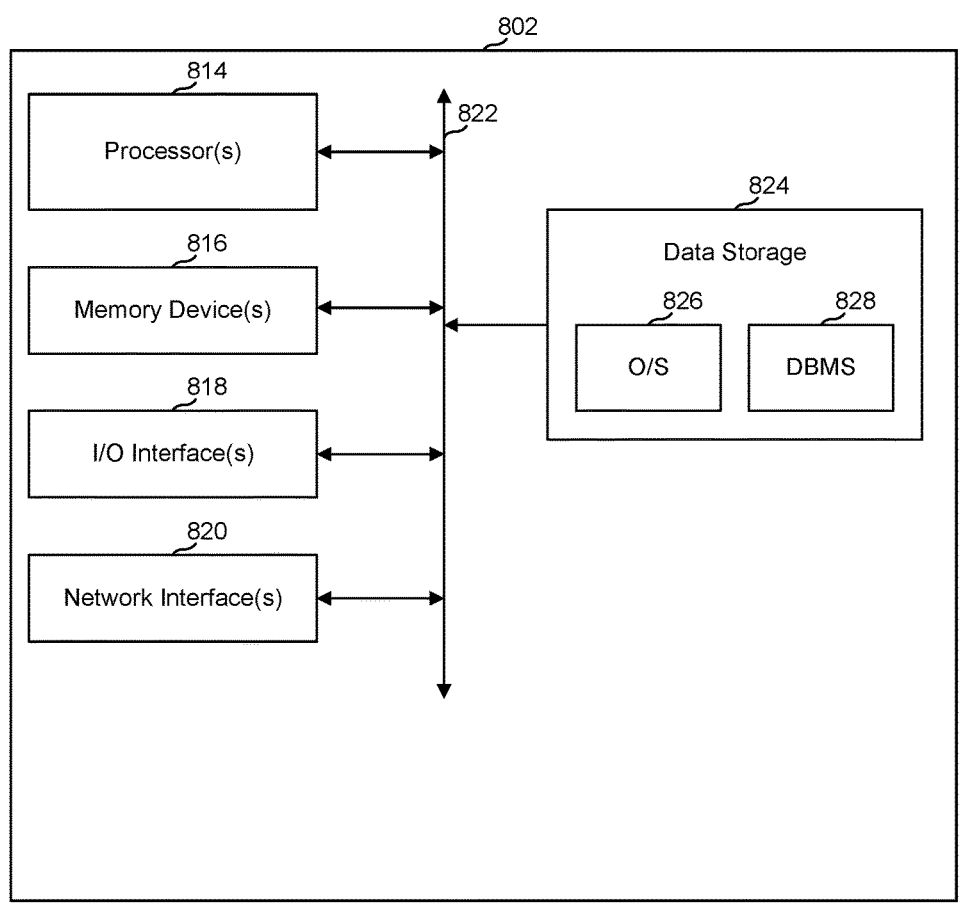
FIG. 8 is a schematic block diagram of a host that might be used in a timer service.

FIG. 8 is a schematic block diagram of a host 802 that might be used in implementing various elements described above. Host 802 can be used as a host for timer service front-end 104, creation worker 110, sweeper workers 118, sweeper worker coordinator 124, firing worker 122, support for computer programs that perform other functions, or the like.

Host 802 may include one or more processors (processor(s)) 814, one or more memory devices 816 (generically referred to herein as memory 816), one or more input/output ("I/O") interface(s) 818, one or more network interfaces 820, and data storage 824. Host 802 may further include one or more buses 822 that functionally couple various components of host 802. Bus(es) 822 may include at least one of a system bus, a memory bus, an address bus, or a message bus, and may permit exchange of information (e.g., data (including computer-executable code), signaling, etc.) between various components of host 802.

Memory 816 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

Data storage 824 may include removable storage and/or non-removable storage including, but not limited to, magnetic storage, optical disk storage, and/or tape storage. Data storage 824 may provide non-volatile storage of computer-executable instructions and other data. Data storage 824 may store computer-executable code, instructions, or the like that may be loadable into memory 816 and executable by processor(s) 814 to cause processor(s) 814 to perform or initiate various operations. Data storage 824 may additionally store data that may be copied to memory 816 for use by processor(s) 814 during the execution of the computer-executable instructions. Moreover, output data generated as a result of execution of the computer-executable instructions by processor(s) 814 may be stored initially in memory 816, and may ultimately be copied to data storage 824 for non-volatile storage. Examples of data that might be stored in memory 816 or data storage 824 include local caches of data store information for data externally stored.

Data storage 824 may store one or more operating systems (O/S) 826; one or more database management systems (DBMS) 828; and one or more program modules, applications, or the like. Any of the program modules may include one or more sub-modules. Any of the modules depicted in FIG. 8 may include computer-executable code, instructions, or the like that may be loaded into memory 816 for execution by one or more of processor(s) 814.

Processor(s) 814 may be configured to access memory 816 and execute computer-executable instructions loaded therein. For example, processor(s) 814 may be configured to execute computer-executable instructions of the various program modules of host 802 to cause or facilitate various operations to be performed.

One or more input/output (I/O) interfaces 818 may be provided that may facilitate the receipt of input information by host 802 from one or more I/O devices as well as the output of information from host 802 to the one or more I/O devices. The I/O devices may include, for example, one or more user interface devices that facilitate interaction between a user and host 802 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

Host 802 may further include one or more network interfaces 820 via which host 802 may communicate with any of a variety of other systems, platforms, networks, devices, and so forth. Such communication may occur via any of one or more of network(s) 812.

It should be appreciated that the program modules, applications, computer-executable instructions, code, or the like depicted in FIG. 8 as being stored in data storage 824 and data storage 846 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on host 802. Further, functionality may be modularized differently such that processing described as being supported collectively by the collection of program modules depicted in FIG. 8 may be performed by a fewer or greater number of modules, or functionality described as being supported by any particular module may be supported, at least in part, by another module. In addition, any of the functionality described as being supported by any of the program modules depicted in FIG. 8 may be implemented, at least partially, in hardware and/or firmware across any number of devices.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for managing a timer service, comprising:
under control of one or more computer systems configured with executable instructions,
receiving timer creation requests from clients, wherein a first timer creation request of the timer creation requests references a timer expiration time and a payload for the first timer, wherein the payload defines an action that a first client requests to be performed by the timer service at the timer expiration time;
adding the first timer creation request to a first queue;
removing the first timer creation request from the first queue for insertion into a timer record;

selecting a target virtual partition from among a plurality of virtual partitions of a timer store, wherein the target virtual partition has an associated sweeper worker assigned to that virtual partition;

updating a timer index record with a reference to the timer record;

storing the timer index record in the target virtual partition of the timer store;

determining that the target virtual partition contains more timer index records than a prespecified capacity boundary;

creating an additional virtual partition in the plurality of virtual partitions;

instantiating an additional sweeper worker to be assigned to the additional virtual partition;

evaluating timer index records in the timer store using the sweeper workers assigned to the virtual partitions of the timer store to identify timers that are reaching expiration; and causing a payload of the timer index record stored in the target virtual partition of the timer store to be executed upon expiration of the timer index record.

2. The computer-implemented method of claim 1, further comprising selecting the target virtual partition that has timer index records referencing timers with expiration times that include timer expiration time of the timer index record being stored.

3. The computer-implemented method of claim 1, wherein removing timers comprises removing a plurality of timers as a unit where the timers of the plurality of timers have payloads with destinations in common with other timers of the plurality of timers.

4. A system, comprising:
an input interface for receiving a first timer creation request from a first client for a first timer, wherein the first timer creation request references a first timer expiration time and a payload for the first timer, wherein the payload references an action that the first client requests to be performed upon the first timer expiration time occurring;

a first queue into which the first timer creation request is enqueued;

a timer store, comprising a plurality of virtual partition instances;

a creation worker, coupled to the first queue, for processing timer creation requests from the first queue to form a first timer record for the first timer creation request in a first timer index record of a target virtual partition instance of the timer store;

a plurality of sweeper workers, a first sweeper worker of the sweeper workers associated with a first virtual partition instance of the plurality of virtual partition instances, wherein the first sweeper worker evaluates a timer index record for the first virtual partition instance to determine the timer index record is an expiring timer index record; and a sweeper worker coordinator that coordinates operations of the plurality of sweeper workers and tracks presence of virtual partition instances.

5. The system of claim 4, further comprising
a firing worker that fires timers referenced in the expiring timer index record by processing payloads of fired timers and executing payloads of the fired timers.

6. The system of claim 4, further comprising:
a first memory for storing client stated throughput requirements; and a timer front-end processor capable of reading the first memory and throttling timer creation requests that exceed a client stated throughput requirement.

7. The system of claim 4, further comprising:
a first memory for storing a scaling schedule comprising scaling anticipation records, wherein a scaling anticipation record is associated with a scaling period and indicates a number of virtual partition instances to be allocated for that scaling period; and an interface to the first memory over which the creation worker reads scaling anticipation records.

8. The system of claim 4, wherein timer records in the timer store include an indication that, for a given timer record, executing the payload is to be skipped in response to a creating client requesting deletion of that given timer record.

9. The system of claim 4, wherein the timer store, arranged as a plurality of virtual partition instances, is further arranged with a first virtual partition instance having a higher storage priority and a second virtual partition instance having a lower storage priority, wherein expiration times of timers referenced in timer index records in the first virtual partition instance are earlier than the expiration times of timers referenced in timer index records in the second virtual partition instance.

10. The system of claim 9, wherein the first virtual partition instance comprises a hot-store virtual partition instance and the second virtual partition instance comprises a cold-store virtual partition instance, the hot-store virtual partition instance having stored timer index records with timer expirations that are sooner than a predetermined priority expiration value and the cold-store virtual partition instance having stored timer records with timer expirations that are later than the predetermined priority expiration value.

11. The system of claim 4, wherein the first sweeper worker includes an indication whether the first sweeper worker is current in its processing of timer expirations from the first virtual partition instance and an indication of a checkpoint time of last processing of the first sweeper worker.

12. A computer-implemented method for managing a timer service, comprising:
receiving a first timer creation request from a client for creating a timer, wherein the first timer creation request includes a client identifier of the client, a timer expiration time for the timer, and a payload of the timer;

adding the first timer creation request to a first queue, using a creation worker;

removing the first timer creation request from the first queue, wherein a rate of removing timer creation requests from the first queue is independent of a rate of adding timer creation requests to the first queue;

forming a first timer record from the first timer creation request, the first timer record including at least a representation of the client identifier, a representation of the timer expiration time, and a representation of the payload;

creating a first timer index record to reference the first timer record;

determining a target virtual partition instance to be associated with the first timer index record;

storing the first timer index record in the target virtual partition instance;

comparing a time period field of the first timer index record to a current time, using a first sweeper worker of a plurality of sweeper workers, the first sweeper worker associated with a target virtual partition instance; and configuring the first timer index record for execution wherein the configuring is done at a time before a start of a time indicated by the time period field.

13. The computer-implemented method of claim 12, further comprising:

coordinating operations of the plurality of sweeper workers;

tracking presence of virtual partition instances;

firing timers referenced in the first timer index records, using a firing worker, to execute payloads of the timers referenced by the first timer index record.

14. The computer-implemented method of claim 12, further comprising:

maintaining a listing of client stated throughput requirements based on prior messages from clients indicating their throughput requirements for timer services; and limiting timer creation requests from a client to that client's stated throughput requirement.

15. The computer-implemented method of claim 12, further comprising:

maintaining a scaling schedule comprising scaling anticipation records, wherein a scaling anticipation record is associated with a scaling period and indicates a number of virtual partition instances to be allocated for that scaling period;

reading the scaling schedule using the creation worker; and creating additional virtual partition instances based on the scaling schedule.

16. The computer-implemented method of claim 12, further comprising:

receiving a client request for deletion of a given timer record; and modifying the given timer record to include an indication that executing the payload for that given timer record is to be skipped.

17. The computer-implemented method of claim 12, further comprising:

arranging a plurality of virtual partition instances including a first virtual partition instance and a second virtual partition instance;

setting the target virtual partition instance to the first virtual partition instance for timers having expiration times earlier than a predetermined priority expiration value; and setting the target virtual partition instance to the second virtual partition instance for timers having expiration times later than the predetermined priority expiration value.

18. The computer-implemented method of claim 12, further comprising:

including, with the first sweeper worker, an indication whether the first sweeper worker is current in its processing of timer expirations from its virtual partition instance and an indication of a checkpoint time of last processing of the first sweeper worker.

19. The computer-implemented method of claim 12, further comprising:

determining a time period for the target virtual partition instance;

comparing the time period to an expiration time of the first timer; and selecting as the target virtual partition instance a virtual partition instance with a time period that includes the an expiration time of the first timer.

* * * * *